United States Patent [19]

Hedrick

[11] 4,173,893
[45] * Nov. 13, 1979

[54] FLUID QUANTITY INDICATOR

[76] Inventor: Geoffrey S. Hedrick, Laurel Cir., Malvern, Pa. 19355

[*] Notice: The portion of the term of this patent subsequent to May 23, 1995, has been disclaimed.

[21] Appl. No.: 859,670

[22] Filed: Dec. 12, 1977

Related U.S. Application Data

[63] Continuation-in-part of Ser. No. 731,229, Oct. 12, 1976, Pat. No. 4,090,408.

[51] Int. Cl.² ............................................. G01F 23/26
[52] U.S. Cl. ..................................................... 73/304 C
[58] Field of Search ....................................... 73/304 C

[56] References Cited

U.S. PATENT DOCUMENTS

| | | | |
|---|---|---|---|
| 2,866,337 | 12/1958 | Minneman et al. | 73/304 |
| 3,079,797 | 3/1963 | Hermanson | 73/304 |
| 3,237,178 | 2/1966 | Valentine | 73/304 |
| 3,301,056 | 1/1967 | Blanchard et al. | 73/304 |
| 3,463,980 | 8/1969 | Cohn et al. | 318/18 |
| 3,534,606 | 10/1970 | Stamler et al. | 73/304 |
| 3,830,090 | 8/1974 | Hersch et al. | 73/304 |
| 4,090,408 | 5/1978 | Hedrick | 73/304 |

*Primary Examiner*—Herbert Goldstein
*Attorney, Agent, or Firm*—Hubbell, Cohen, Stiefel & Gross

[57] ABSTRACT

An improved fluid quantity indicator, such as for aviation fuel, of the type utilizing capacitive type sensing probes in which a capacitance change occurs proportional to the amount of fluid in a tank or container due to the dielectric constant of the fluid being different from that of air, in which the improvement comprises microprocessor control means for providing display and totalizing control in conjunction with automatic compensation for the zero fluid capacitance variation in a tank and automatic adjustment of the fluid full scale reading for variation in fluid tank capacitance. The microprocessor controls two independent digital servo loops, one of which is nulled when the microprocessor output is equivalent to the fluid quantity for providing a container configuration independent real time digital display of fluid quantity within a given container, and the other of which is nulled when an in-phase signal of equivalent magnitude and opposite sense to cancel out the real component leakage present across the sensing probes is provided. In addition, the microprocessor may be coupled to another microprocessor which functions to total the signals from a plurality of containers or tanks on board the aircraft to provide a total display of fluid on board.

15 Claims, 7 Drawing Figures

FIG. 4.  PROGRAM FLOW CHART

FLUID QUANTITY INDICATOR

CROSS-REFERENCE TO RELATED APPLICATIONS

This application is a continuation-in-part of my co-pending U.S. patent application Ser. No. 731,229, filed Oct. 12, 1976 and entitled "Fluid Quantity Indicator, now U.S. Pat. No. 4,090,408.

BACKGROUND OF THE INVENTION

1. Field of the Invention

The present invention relates to apparatus for indicating the quantity of fluid contained within a container therefor.

2. Description of the Prior Art

Prior art fluid quantity indicators, such as the type utilized for providing an indication of the quantity of aviation fuel in a given tank, are normally dependent on the particular unique fuel tank configuration in which the indicator is being utilized. These aircraft fuel sensor probes are generally of the capacitive type, such as where the sensing element or probe comprises a concentric tube capacitor, such as disclosed by way of example in U.S. Pat. Nos. 2,866,337 and 3,534,606, preferably mounted in the vertical position in the tank, or in multiples within the tank to average out variation in pitch of the aircraft, and another capacitor, utilized as a reference capacitor, lying in a horizontal position in the bottom of the tank. A capacitance change, in such prior art fluid quantity indicators, occurs proportional to the amount of fluid or fuel in the tank since the dielectric constant of aviation fuel, by way of example, is different from that of air. The reference capacitor probe located in the bottom of the tank normally remains submerged at all times and compensates for variation of the dielectric constant of the fuel with changes in temperature, pressure, and fuel type.

In such prior art fuel quantity indicators, the sensing elements and the reference capacitors in the tank are normally not held to a precise zero fuel and full tank capacitance and, accordingly, since these values change from aircraft to aircraft for the same tank, a zeroing adjustment of the fuel quantity indicator is required at each installation of an indicator. In addition, a different full scale factor must be set for each type or capacity tank. Accordingly, depending upon the failure rate of the fluid quantity indicator, a substantial amount of time in rezeroing the indicators and in resetting the scale factor is expended since the indicator has to be zeroed upon replacing a failed unit and the scale factor has to be set for each different capacity fuel tank. On an average, there are three to four fuel tanks per aircraft with a varying fuel capacity and variable changes in capacitance per unit volume so that in a given aircraft fuel tank, such as one having a 10,000 pound fuel capacity, the tank might have a capacitance change of the sensor from empty to full of 1,000 picofarads and another fuel tank on the same aircraft might have a fuel capacity of 80,000 pounds with an identical probe capacitance change. This lack of standardization of capacitance change versus fuel quantity requires a separate indicator for each tank with its full scale indication adjusted for the appropirate capacitance change of that fuel tank. Accordingly, this lack of standardization in prior art fuel quantity indicators which makes them fuel tank dependent requires the maintenance of a large inventory of such indicators for use in several different types of aircraft with different capacity fuel tanks.

Furthermore, prior art fuel quantity indicators have generally previously been primarily analog systems which, in the field of airborne instrumentation, primarily utilize moving parts which are normally less reliable than systems without such moving parts, particularly when subjected to extreme environmental conditions and, in addition, such prior art analog systems have not been satisfactorily lightweight and compact. In an attempt to overcome some of these disadvantages, some recent prior art fluid quantity indicators have been digital systems, such as the type disclosed in U.S. Pat. Nos. 3,301,056 and 3,463,980, as opposed to analog systems, such as the analog servo bridge type of system, such as disclosed in U.S. Pat. No. 3,079,797. These digital prior art systems, however, suffer from the same disadvantage of the prior art analog systems with respect to being dependent on the particular fuel tank configuration so that the scale factor and the zero set for a given fuel tank has to be accomplished each time a new indicator is installed and/or is utilized in a different capacity fuel tank. These disadvantages of the prior art are overcome by the present invention.

SUMMARY OF THE INVENTION

An improved apparatus responsive to the quantity of a fluid within a container therefor of a predetermined volume, in which the apparatus comprises a capacitive sensing means disposed within the container volume so as to be immersible within the fluid and any air within the container volume, the capacitive sensing means having an associated variable dielectric constant which is proportional to the proportionate amount of fluid within the container volume, the sensing means capacitance varying in accordance with the variation in the proportionate amount of fluid, and a reference capacitive means disposed within the container so as to normally be immersible within the fluid and responsive to variations in the dielectric constant of the fluid due to environmental conditions, utilizes a microprocessor control means and a digital display for providing a digital read out of the quantity of fluid within the tank, automatically compensating for both the scale factor and the zero set for the fuel tank in an all digital system to provide a container configuration independent real time digital display of fluid quantity within a given container. A first independent digital servo control loop is provided which is nulled when the microprocessor control means output is equivalent to the fluid quantity. In addition, a second independent digital servo loop is also provided which is nulled when the microprocessor control means output is equivalent to the magnitude of the in-phase component but opposite in sense to the in-phase leakage across the sensing probes.

The digital system includes an AC reference means, such as an integrated circuit function generator chip capable of generating a low distortion sine wave, which reference source is operatively connected to the sensing means for providing a signal having a predetermined phase and frequency thereto; the microprocessor control means, which is conventionally programmable to provide desired control functions, such as a conventional F8 microprocessor of the type manufactured by Mostec or Fairchild, which microprocessor control means provides a control signal output indicative of the fluid quantity; and a first digital-to-analog conversion means having a magnitude input operatively connected in parallel to the microprocessor control means control signal output for providing an output in response to the input. The first digital-to-analog conversion means output is operatively connected to the reference capacitive means wherein the output comprises a signal having a predetermined phase opposite to the AC reference means signal phase and a predetermined frequency identical therewith. The microprocessor control means is programmable to enable a universal apparatus full scale set compensation for containers for the fluids substantially independent of the container configuration for compensating for variations in full scale capacitance of a given container and directionally counting in response to directional counting command signals provided thereto. In addition, a differential amplifier summing means is provided having an input operatively connected to the capacitive sensing means and the capacitive reference means outputs for summing the output signals provided therefrom. Means are operatively connected to the summing means output in order to provide a directional counting command signal in response to the summing means output with the counting command signal being operatively connected to the microprocessor input, the microprocessor counting in response to the directional counting command input signal for providing a display control signal output dependent thereon. The microprocessor control means output is operatively connected in parallel to a digital display means for controllably providing a digital display of the fluid quantity on the digital display means in response to the control signal output. The aforementioned AC reference means capacitive sensing means, capacitive reference means, summing means, directional counting signal providing means, microprocessor control means and first digital-to-analog conversion means comprise the aforementioned first independent digital servo control loop which is nulled when the microprocessor control means output is equivalent to the fluid quantity, whereby a container configuration independent real time digital display of fluid quantity within a given container is provided. The microprocessor control means is also preferably programmed to provide a universal apparatus zero set compensation for containers for the fluid substantially independent of the container configuration for compensating for variations in the zero fluid capacitance of a given container.

In addition, the digital system includes a second digital-to-analog conversion means having a magnitude input operatively connected in parallel to the microprocessor control means control signal output for providing an output in response to the input, with the input to the second digital-to-analog conversion means being proportional to the magnitude of the in-phase leakage signal across the reference capacitive means. The second digital-to-analog conversion means output is operatively connected to the summing means input for providing a signal in-phase with the leakage signal thereto of equivalent magnitude and opposite sense for cancelling out any real component leakage across the capacitive sensing means. A second summing amplifier is operatively connected to the AC reference source through an inverter at a second summing junction with the second digital-to-analog conversion means output being operatively connected to this summing junction. The microprocessor enables the second digital-to-analog conversion means to be summed with the inverted AC reference signal at half count on the second digital-to-analog conversion means for providing a zero in-phase signal output from the second summing amplifier. The second summing amplifier output is operatively connected to the first summing means input for providing an output to the first summing means input swinging both in-phase and out-of-phase with the leakage signal for providing the aforementioned component leakage cancellation. In addition, a peak sampling demodulator is operatively connected to the first summing amplifier output for sampling the first summing amplifier output at substantially 90 degrees with respect to the AC reference signal. A second means is operatively connected to the peak sampling demodulator output for providing a second directional counting in-phase command signal to the microprocessor input in response to the peak sampling demodulator output, with the microprocessor providing the aforementioned proportional control signal input to the second digital-to-analog conversion means in response to this in-phase command signal input. Thus, the AC reference means capacitive sensing means, capacitive reference means, first and second summing means, second directional counting signal providing means, microprocessor control means, second digital-to-analog conversion means and peak sampling demodulator comprise the aforementioned second independent digital servo control loop which is only responsive to the in-phase component due to leakage and which is nulled when the microprocessor proportional control signal output provided to the second digital-to-analog conversion means input is in-phase with this leakage signal and of equivalent magnitude and opposite sense thereto.

A multiplexer is operatively connected between the first and second directional counting means outputs and the microprocessor control means input for enabling the microprocessor to controllably scan the directional command signals from the first and second independent digital servo loops and selectively provide the control signal outputs to the first and second digital-to-analog conversion means inputs in response thereto.

In addition, the microprocessor comprises means for sequentially strobing the digital display with the display control signal output for providing the digital display of the fluid quantity. The digital display comprises a plurality of separate digit displays combinable to provide the total display of the fluid quantity with an equal plurality of switching means being operatively connected between the strobing means and an associated one of the separate displays which switches are sequentially enabled by the microprocessor for sequentially scanning the total display of the fluid quantity. The microprocessor selectively controllably blanks the separate digital displays for controlling the intensity of the display as a direct function of the blanking interval of the separate digital displays. The display control signal output may also be coupled to a second microprocessor which functions as a totalizer for a plurality of such microprocessors in order to provide a total fluid quantity for a plurality of containers or tanks in a system, such as on board an aircraft having a plurality of fuel tanks.

DETAILED DESCRIPTION OF PREFERRED EMBODIMENTS

Figure 1:
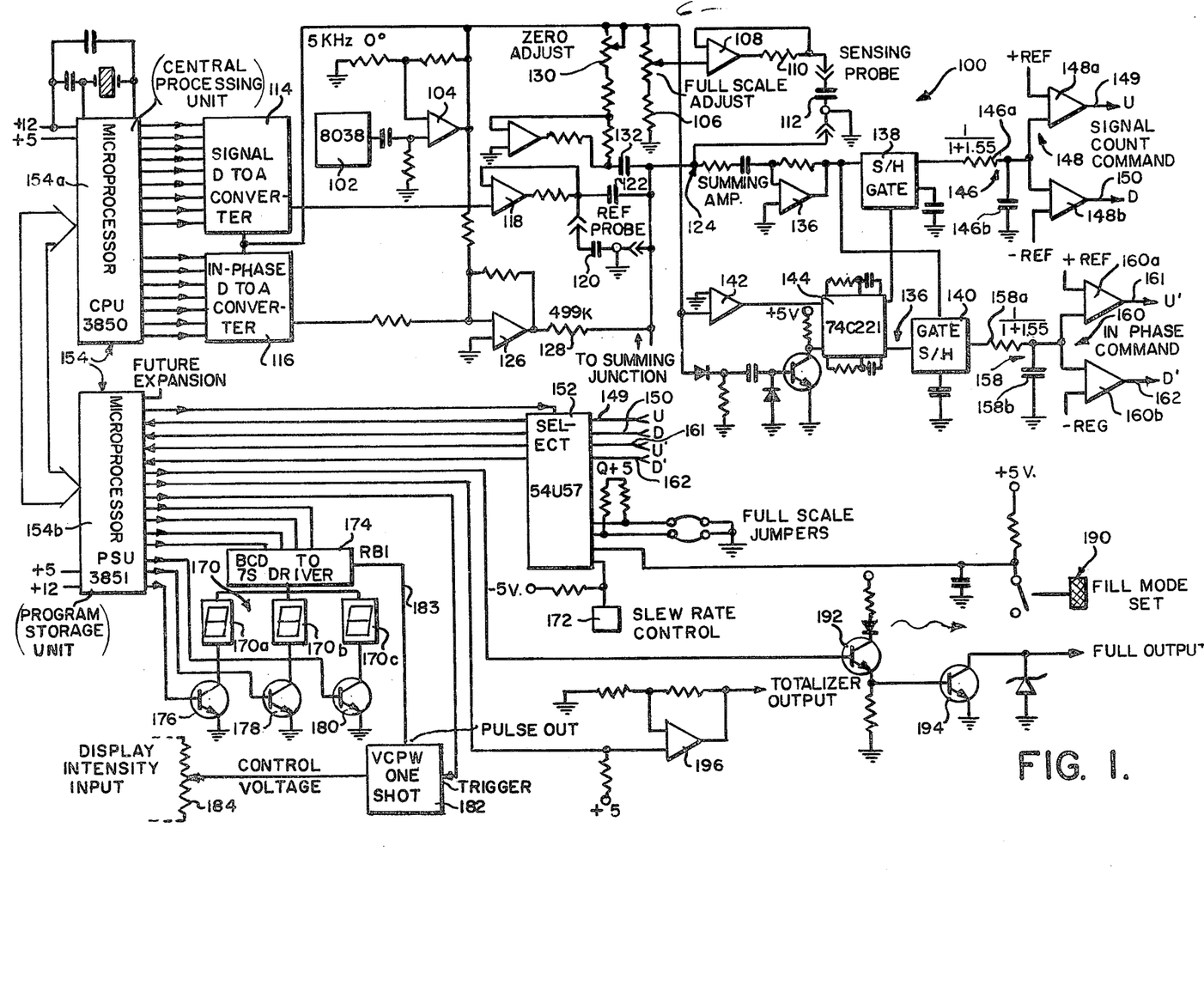
FIG. 1 is a logic block diagram, partially in schematic, of the preferred embodiment of the improved fluid quantity indicator in accordance with the present invention.

Referring now to the drawings in detail, and initially to FIG. 1 thereof, an improved fluid quantity indicator in accordance with the present invention, generally referred to by the reference numeral 100, is shown. The fluid quantity indicator 100 of the present invention preferably includes a conventional AC reference signal generator, such as an integrated, circuit function generator, such as a Fairchild 8038 function generator, which generates a low distortion sine wave. By preferably employing such a conventional integrated circuit function generator chip as an AC internal frequency reference, no external components are required, and the amplitude is not frequency dependent thereby assuring a stable magnitude reference signal. The reference sine wave from this frequency generator 102 is preferably provided to a conventional operational amplifier 104 with a gain scaling full range adjust potentiometer 106. The output of this potentiometer 106 is preferably fed to a conventional bandwidth current limited operational amplifier 108 which buffers the reference input of the potentiometer 106 therefrom through a series resistance 110 to drive a capacitive load 112 associated with a sensing probe 113. The resistance 110 in series with the output of amplifier 108 assures stability of operational amplifier 108 and acts as a conventional backup current limiter to preclude ignition of the fluid or fuel in the tank or container therefor. The operational amplifier 108 also has a feedback loop which preferably provides feedback at the sensing probe 113 side of the series limiting resistor 110 to assure a low stability output impedance thereby preferably making this signal level insensitive to shunt capacitance and shunt resistance.

The reference signal output of AC reference source 102 is also preferably connected to a pair of conventional digital-to-analog converters 114 and 116 which are also preferably conventional solid state integrated circuit digital-to-analog converters. The output of digital-to-analog converter 114, which converter is termed the "signal digital-to-analog converter", is preferably fed through a conventional inverting buffer amplifier 118 to a capacitor 120 associated with a reference probe 121, and in parallel to an associated conventional compensation capacitor 122. The density compensation capacitor 122 is preferably connected directly to an input summing junction 124 to be described in greater detail hereinafter.

The output of the other digital-to-analog converter 116, which converter is termed the "in-phase digital-to-analog converter", is preferably summed with an inverted reference such that at half count on the digital-to-analog converter 116, there is zero in-phase signal out of a conventional summing amplifier 126 to whose input the output of converter 116 is connected. This allows the output of this amplifier 126 to preferably swing both in-phase and out-of-phase feeding a load resistor 128 connected to the output of amplifier 126, such as a 500 ohm resistor, into the aforementioned signal summing junction 124. This portion of the circuit, from converter 116 through amplifier 126 and resistor 128 into summing junction 124 forms a portion of an independent digital in-phase nulling servo loop which provides an in-phase signal of equivalent magnitude and opposite sense to cancel out any real component leakage present across the probes employed with the fluid quantity indicator 100 of the present invention.

As also shown and preferred in FIG. 1, the referencce generator 102 signal is also inverted and gain scaled by a conventional rear access potentiometer 130 connected in parallel with full range adjust potentiometer 106. Potentiometer 130 preferably provides a zero fuel adjustment by feeding the signal through an associated predetermined capacitance 132, such as a 300 picofarad capacitor, into the aforementioned signal summing junction 124. The aforementioned opposite sense reactive component signal which is thereby provided preferably cancels out the zero fuel capacitance of the aforementioned sensing probe 113.

The aforementioned summing junction 124 is preferably connected through a conventional series resistance 134 to a conventional high gain broad band operational amplifier 136. The forward gain of this amplifier 136 is preferably set at a level to preclude saturation from noise induced from airplane wiring and leakage resistance, assuming the fluid quantity indicator is to be employed in an aircraft for determining the quantity of aviation fuel on board, in which instance, the forward gain of this amplifier 136 may be set at 100, by way of example. This arrangement preferably further precludes damage to the internal circuitry from noise spikes appearing at this input stage.

The output of this scaling summing amplifier 136 is preferably fed to a pair of conventional monolithic sample hold amplifiers 138 and 140. Amplifier 138 is preferably gated by a conventional zero crossing detector 142 whose output is fed through a conventional CMOS dual one-shot multivibrator 144, such as a National Semiconductor 74C221 multivibrator. This one-shot multivibrator 144 preferably provides an accurate sample command of predetermined duration, such as two microseconds, at the zero crossing point of the reference signal which is the peak of the reactively coupled probe signal. This accurate sample preferably provides quadrature demodulation such that the resulting DC voltage is proportional only to the reactively coupled error signal. The real components which result from leakage resistance are preferably stripped and ignored by subsequent conventional integrating filters and threshhold detectors. The output of this aforementioned amplifier 138 is preferably connected to a conventional low pass filter 146 comprising a resistor 146a and a capacitor 146b which low pass filter 146 preferably has a predetermined time constant, such as 1.5 seconds, and a predetermined attenuation, such as 70 db attenuation to 400 cycle noise, which, by way of example, will reduce a two volt RMS 400 cycle noise signal to less than 1 millivolt which signal level would be totally ignored by the conventional 50 millivolt threshhold detectors which may preferably be employed with the system 100 of the present invention. The output of the low pass filter 146 is preferably provided to a directional count command providing network 148 which comprises a pair of conventional comparators 148a and 148b which are each conventionally coupled to a reference signal for providing either an up signal count command or a down signal count command, respectively, depending on the value of the signal provided in parallel thereto from the low pass filter network 146. The up signal count command signal is provided via path 149 and the down signal count command signal is provided via path 150, with both of these count command signals provided via paths 149 and 150 being provided to a conventional quad-one-out-of-two integrated circuit multiplexer 152, such as a Texas Instruments 54L157, and therefrom to a conventional microprocessor 154 which controls the operation of the preferred fluid quantity indicator 100 as will be described in greater detail hereinafter. As shown and preferred, microprocessor 154 preferably is a conventional microprocessor, such as an F8 microprocessor of the type manufactured by Mostec or Fairchild, which preferably comprises a central processing unit 154a, such as a Fairchild 3850 CPU or a Mostec MK3850 CPU, and a conventional program storage unit 154b, such as a Fairchild 3851 PSU or a Mostec MK3851 PSU. Microprocessor 154 is preferably conventionally programmed in F8 Assembler language. A typical program flow chart is illustrated, by way of example, in FIGS. 4 through 7, which flow chart may be used by one of ordinary skill in the art to readily write the conventional program for microprocessor 154 in F8 Assembler language so as to enable the microprocessor 154 to provide the requisite control functions for the system 100 of the present invention as will be described in greater detail hereinafter.

Before describing the microprocessor 154 in any greater detail, the previously referred to second independent in-phase digital servo or nulling loop shall be further described. This loop is preferably controlled by microprocessor 154 and further includes a peak sampling demodulator 156 which preferably comprises miltivibrator 144 and amplifier 140, which preferably samples the output of summing amplifier 136 at 90 degrees with respect to the reference signal. The in-phase component due to leakage will be at its peak value at this sampling point and, accordingly, the in-phase nulling loop preferably only responds to the in-phase component and cancels it out by preferably generating an equal but opposite sense signal from the in-phase digital-to-analog converter 116. The magnitude of the signal or number present at the input to the in-phase digital-to-analog converter 116, which signal is provided from the central processing unit 154a of the microprocessor 154 via the output control lines illustrated in FIG. 1, is preferably proportional to the magnitude of in-phase leakage across the reference 121 or sensing 113 probe. This magnitude can preferably be conventionally scaled and displayed through control of the microprocessor 154, if desired.

The other independent digital servo loop, is the servo loop through which the directional count command signals are provided via paths 149 and 150 and is the servo loop which is preferably nulled when the control output of the central processing unit 154a, which is provided to the input of the signal digital-to-analog converter 114, is equivalent to the fluid quantity. The aforementioned in-phase nulling loop, as was previously mentioned, comprises amplifier 140 whose output is provided to a separate low pass filter network 158 which is preferably identical to filter 146 and includes a resistor 158a and a capacitor 158b. The output of this low pass filter 158 is also similarly preferably provided to a directional counting network 160 comprising a pair of conventional comparators 160a and 160b which are conventionally connected in parallel to the output of filter 158 and to respective reference sources to provide either an up directional in-phase counting command via path 161 or a down directional in-phase counting command via path 162 to the aforementioned multiplexer 152. As was previously mentioned, this loop is nulled when the microprocessor 154 central processing unit 154a provides a control signal to the input of in-phase digital-to-analog converter 116 which is equal but opposite in sense to the in-phase leakage present across the reference 121 or sensing 113 probe.

As is shown and preferred by the conventional program flow chart of FIGS. 4 through 7 taken together, the microprocessor 154 conventionally provides up/down binary counting in response to the directional count command signals provided via paths 149, 150, 161 and 162 to control the signal and in-phase cancellation digital servo-loops, respectively. Microprocessor 154 preferably scans the respective up/down commands provided from these two loops via paths 149, 150, 161 and 162 through the multiplexer 152 which expands the number of input/output ports to the microprocessor program storage unit 154b. Preferably, these up/down command signals provided via paths 149, 150, 161, 162 are scanned at predetermined regular intervals, such as every three seconds, and the appropriate count is generated and is conventionally latched in the output control lines from central processing unit 154a which feed the respective digital-to-analog converters 114 and 116. By selecting a relatively short scanning interval, such as the aforementioned three second update rate by way of example, display 170 flicker, such as could be caused by fuel movement in the tank, is preferably eliminated. The control of this digital display 170 which preferably comprises three separate digit displays 170a, 170b and 170c, shall be described in greater detail hereinafter. It should be noted, however, that, if desired, this update rate may be significantly increased, such as by 128 times, under certain conditions, such as on power-up initialization where the aforementioned servo loops may be run at this increased speed until they reach an initial null condition in order to assure immediate data availability following initial turn-on, or during shop maintenance and calibration procedures such as where a pin 172 brought out to the rear connector of the unit could be grounded to cause the display 170 to respond at a significantly increased rate to facilitate calibration and testing. Before describing the display 170 in greater detail, it should be noted that preferably to optimize the accuracy of the aforementioned digital-to-analog converters 114 and 116, the conventional microprocessor 154 preferably scales the binary data present in its conventional internal counters prior to conversion to binary coded data for ultimate display in order to assure that better than 80% of full scale count is used for full range, thereby enhancing both the resolution and accuracy of the system 100. Such scaling may be accomplished by the binary pattern shorting of scaling control pins to ground thereby selecting the appropriate multiplication factor for the binary data in the conventional internal counters of the microprocessor 154. This binary data is preferably converted to binary coded decimal data after such prescaling multiplication with the binary coded decimal data being, in turn, preferably stored in conventional internal memories of the microprocessor 154b and sequentially strobed to the output ports of the program storage unit 154b, such as the four output ports shown by way of example in FIG. 1, which are employed to drive a conventional binary coded decimal-to-7 segment decoder driver 174. Such a decoder driver 174 is preferably used with the three separate displays 170a, 170b and 170c comprising the digital display 170, by way of example. Of course, if more than three digits of display are desired, then the display circuit may be conventionally modified to accomplish this as is also true if less than three digits of display are desired.

In the example illustrated in FIG. 1, the three displays 170a, 170b and 170c, are preferably sequentially scanned through three control lines provided from the program storage unit 154b which sequentially energize conventional switching transistors 176, 178 and 180, respectively, located at the common cathodes of the displays 170a, 170b and 170c, respectively, the displays 170a, 170b, 170c preferably comprising conventional LED displays. As shown and preferred, an eighth independent control line output from program storage unit 154b is preferably employed to trigger a conventional voltage controlled variable pulse width single-shot 182, such as a Signetic 555 timer operated in this manner. Each time a display digit 170a, 170b or 170c is scanned by microprocessor 154, a trigger pulse is preferably provided which initiates a voltage controlled one-shot function by one-shot 182, which in turn feeds the ripple blanking input via path 183, to the decoder driver 174. The duration of this pulse width is preferably controlled by an external control voltage derived from a single potentiometer 184, such as one which is externally located, enabling a simultaneous display intensity control for all indicators and a totalizer to be described in greater detail hereinafter. Thus, summarizing the display intensity control, the display intensity input control signal determines the pulse width of one-shot 182 which is triggered from microprocessor 154 when the display 170 is addressed. The one-shot 182 provides a blanking signal to the ripple blanking input to decoder driver 174 which blanks the display 170 and prevents the display 170 from turning on, the control voltage thus determining the duty cycle or length of the blanking signal provided while the display 170 is addressed, since, preferably, only when this ripple blanking input is not present, and the display 170 is addressed, will the display 170 be on. Thus, the intensity of the scanned display 170 is a direct function of the duty cycle of this blanking signal, the longer the display 170 is on, the brighter the display 170.

As further shown and preferred in FIG. 1, if desired, an optional fill mode can be provided in the system 100, with this optional fill mode being activiated by pressing a switch 190 which clears the display counters of microprocessor 154 to zero and forces an upward count at a predetermined high speed, such as 10 counts per seconds by way of example. In this optional arrangement, preferably when the switch 190 is released and then pressed again, these counters will advance at a low rate, such as approximately two counts per second by way of example. Thus, when the desired value is obtained, the switch 190 is released and the system 100 will automatically revert to the fill mode. During this optional fill mode, the display 170 would automatically flash a predetermined indication, such as three F's, and the preselected fill level. When the fuel in the tank reaches this preselected fill level, a signal such as provided by a conventional light emitting diode or LED 192, will come on to indicate that the preselected level has been achieved, with a conventional transistor switch 194 closure at a rear connector permitting signaling remotely to the filling station in order to tell the crew that the preselected value has been achieved. Such fill cycle can be cleared at any point by depressing the fill switch 190 a third time in order to switch the fluid quantity indicator back into the preferred sensing mode for displaying the quantity of fuel in the tank.

The microprocessor 154 can also provide communications protocol for a microprocessor based fuel quantity totalizer for a plurality of tanks. In such an instance, the scaled binary coded decimal data would preferably be fed out of a separate input/output port of the program storage unit 154b to a conventional level shifting buffer amplifier 196, as shown in FIG. 1. This data would preferably be serially transmitted asynchronously at a predetermined rate, such as 100 baud by way of example. Word sync gaps would provide synchronization of data words along with the start and stop bits and a parity bit would preferably be transmitted to insure errorless data transmission with the buffer amplifier 196 preferably providing a controlled rise and fall time of predetermined interval, such as 10 microseconds by way of example, to eliminate EMI generation. The aforementioned fuel totalizer would preferably incorporate a microprocessor identical to microprocessor 154 which would sum all of the signals to totalize the various individual fuel quantity indicators 100 on board the craft with each fuel quantity indicator preferably, by way of example, transmitting the value of fuel to the nearest 100 pounds asynchronously on a single wire to the totalizer. The totalizer would preferably poll each fuel quantity indicator input and synchronize itself on the word sync gap, such as a word sync gap of 24 bits by way of example. A start bit would preferably initialize data reception and the data would be transferred into the totalizer central processing unit, preferably identical to central processing unit 154a, at the aforementioned transmission rate. Parity would then preferably be checked for the incoming data word and it would be further compared to the previous piece of data to insure that more than one count had not occurred within the polling interval, such as an interval of three seconds. Preferably, in such an arrangement if a change of larger than the preselected 100 pounds, by way of example, which corresponds to one bit, occurred in less than this polling interval, an error routine would be initiated and the input resampled. If this condition persisted for a predetermined number of consecutive intervals, such as five, the totalizer would then preferably flash a display corresponding to the defective fuel quantity indicator's number until such display was cleared. Preferably, in such a totalizer, at each polling the fuel quantity indicator's value would be stored in a independent memory location and added to generate the total fuel available with the totalized fuel then being displayed on a digital display corresponding to digital display 170 in an identical fashion with the fuel quantity indicators which were described above with respect to system 100.

Figure 2:
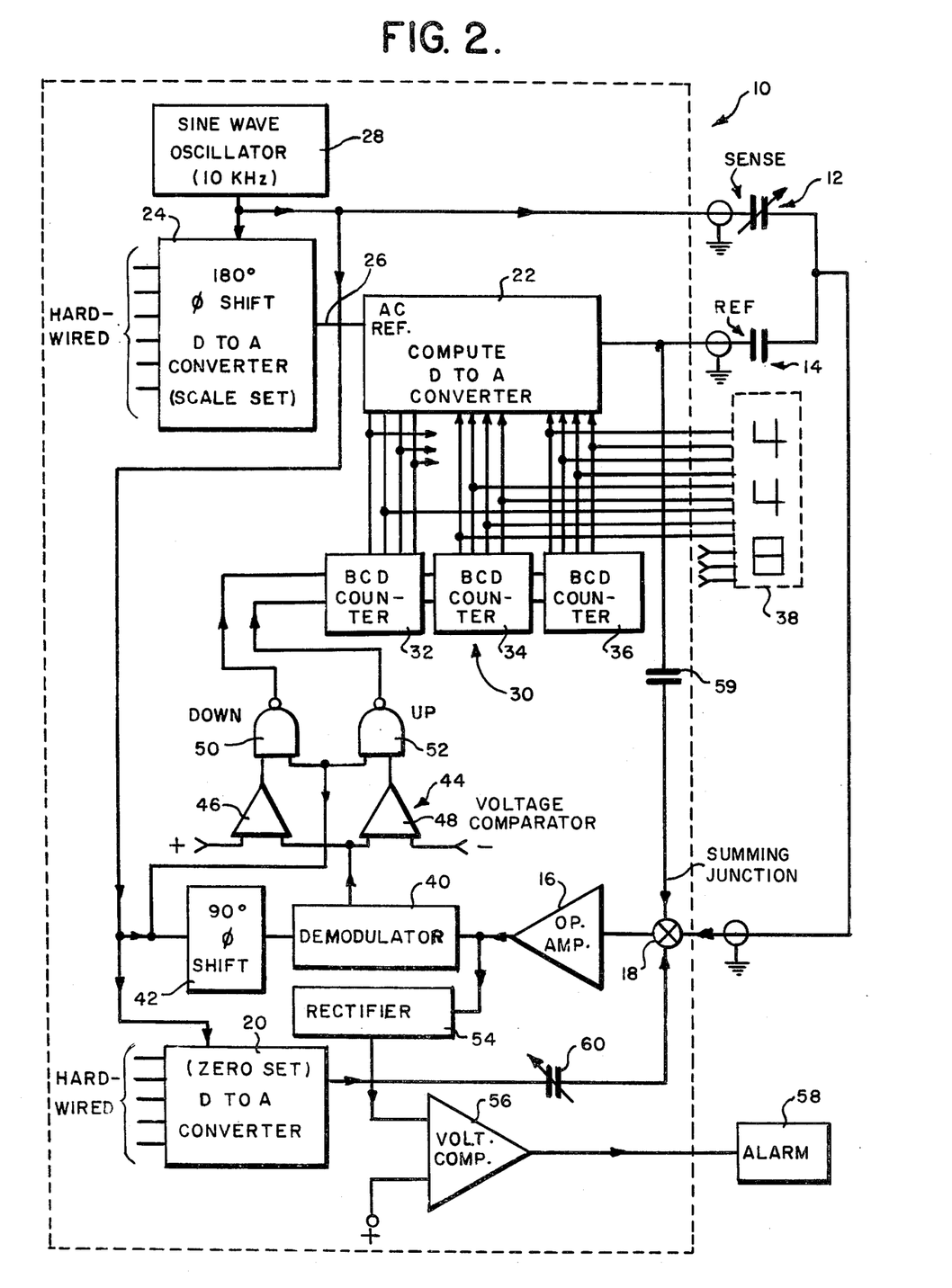
FIG. 2 is a logic block diagram, partially in schematic, of an alternative embodiment of the fluid quantity indicator of FIG. 1, and corresponds to the embodiment described in my copending U.S. patent application Ser. No. 731,229, filed Oct. 12, 1976, now U.S. Pat. No. 4,090,408 of which this application is a continuation-in part.

The above described preferred system of FIG. 1 is presently preferred over the system of FIG. 2 described in my previous application U.S. Ser. No. 731,229, filed Oct. 12, 1976 of which this application is a continuation-in-part. However, for purposes of completeness, the system of FIG. 2 which is described in my previous copending patent application shall be repeated herein although the contents of said application are specifically incorporated by reference herein in their entirety.

Referring now to FIG. 2, an alternative embodiment of the fluid quantity indicator 100 of FIG. 1, generally referred to by the reference numeral 10, which corresponds to that described in my aforementioned copending patent application, shall now be described. Preferably, indicator 10 includes a sensing capacitor 12, such as a conventional parallel plate concentric tube capacitor, which is preferably mounted in the vertical position in a tank for the fluid. For purposes of explanation, this system 10, as was illustrated with respect to system 100, is preferably utilized for detecting the presence of aviation fuel within a tank therefor, although, if desired, as is true with the system 100, any type of fluid may be detected within a container or tank therefor with appropriate conventional modifications for the dielectric constant thereof. Accordingly, the system 10 of FIG. 2 shall also be described in terms of the fluid preferably being aviation fuel. The conventional sensing capacitor 12 is preferably located in the fluid or fuel to be sensed so that the dielectric between its electrodes changes as the fluid replaces the air. A reference capacitor 14 is also preferably located in the fuel tank, such as preferably in a horizontal position in the bottom of the tank so as to normally remain submerged at all times. A capacitance change occurs proportional to the amount of fuel or fluid in the tank since the dielectric constant of aviation fuel, by way of example, is different from that of air. The reference probe or capacitor 14 compensates for variations of this dielectric constant of the fuel with changes in temperature, pressure and fuel type. As will be described in greater detail hereinafter, the signal supplied to the reference probe or capacitor 14 is preferably opposite in phase but identical in frequency with the signal supplied to the sensing probe or capacitor 12, these two signals, as will be described in greater detail hereinafter, preferably being summed at a high gain operational amplifier 16 summing junction 18. As shown and preferred in FIG. 2, a conventional linear regression capacitor 59 is connected in parallel with the reference probe 14 in order to compensate for the temperature coefficient of the fuel's chemistry.

The indicator system 10 of FIG. 2 also preferably includes a digital-to-analog converter 20 which feeds a bias signal to the summing junction through capacitor 12 and reference capacitor 14 output signals. The magnitude of this bias signal is preferably controlled by the programmable converter 20, such as by hard-wire programming the converter 20 in conventional fashion, the converter 20 being, by way of example, such as of the type manufactured by Hybrid Systems under the designation 331-10. The converter 20 is preferably programmed in conventional fashion to select a bias signal sufficient to zero out or zero set the indicator 10 and, since the empty tank capacitance does not change except if the major structural tank is altered, this zero bias or zero set information which is hard-wired will automatically feed the zero bias through the digital-to-analog zero set converter 20. Thus, the converter 20 may be programmed in conventional fashion to be fuel tank configuration independent so that once it is set, it does not have to be reset when a new indicator is installed in a fuel tank.

As will be described in greater detail hereinafter, the indicator system 10 of FIG. 2 also preferably includes a conventional multiplying digital-to-analog converter 22, such as a 331-10 converter manufactured by Hybrid Systems. Another multiplying digital-to-analog converter 24, such as a 331-10 converter manufactured by Hybrid Systems, is utilized to provide the reference magnitude of the computing digital-to-analog converter 22, converter 24 also preferably being conventionally programmed, such as by rear connector programming to provide the proper full scale reading of the indicator and to compensate for variations in the full scale capacitance of the fuel tank, converter 24 automatically adjusting the reference voltage provided via path 26 to the computing digital-to-analog converter 22. Thus, converter 24 is termed the scale set converter. Converter 24 enables the use of a single indicator in all tank configurations. The indicator system 10 of FIG. 2 also preferably includes an AC reference signal source, such as one providing a carrier signal of 10 kilohertz, by way of example, from a conventional sine wave oscillator 28. This AC reference signal output of oscillator 28 has a predetermined phase and frequency and is provided in parallel to the sensing probe or capacitor 12 and to converters 20 and 24. This reference signal is preferably phase shifted 180 degrees by converter 24 to provide an AC reference signal via path 26 to computing digital-to-analog converter 22 which is opposite in phase and identical in frequency with the reference signal provided to sensing capacitor 12, the outputs of sensing capacitor 12 and reference capacitor 14 being equal in frequency and opposite in phase.

A conventional up/down binary coded decimal counter 30, such as preferably a three digit binary coded decimal counter comprising stages 32, 34 and 36, with one stage being provided per digit, as will be described in greater detail hereinafter, preferably provides a count which is representative of the quantity of fluid or fuel within the tank. The output of the counter 30 is preferably connected to a conventional digital display 38, such as a solid state light emitting diode display or a nixie tube display which, in the example shown, is a three digit display. Of course, if the indicator 10 is to be utilized for fuel tanks having a greater capacity than capable of being indicated by a three digit display, the counter 30 may contain additional stages for providing the additional digits and the display 38 may contain an appropriate number of additional digit display positions. As will be described in greater detail hereinafter, the summing output of the operational amplifier 16 is preferably provided to a conventional demodulator 40, which is provided with the AC reference signal output of oscillator 28 phase shifted 90 degrees by a conventional 90 degree phase shifter 42 to provide a carrier signal which is 90 degrees phase shifted from the reference signal for demodulating the output of the operational amplifier 16. Thus, as previously mentioned, for purposes of generating the directional counting signal, preferably only the quadrature current associated with the summing output of operational amplifier 16 is looked at. The output of demodulator 40 is connected in parallel to a conventional voltage comparator 44 which comprises a pair of conventional threshhold detectors 46 and 48 having a positive and a negative, respectively, reference threshhold value. The output of positive threshhold detector 46 of comparator 44 preferably provides one input to a conventional two input NAND gate 50 termed the down gate for the logic chosen and the output of negative threshhold detector 48 of comparator 44 is supplied as one input to another conventional two input NAND gate 52 termed the up gate for the logic chosen. The clock enable pulse for gates 50 and 52 is connected to the other inputs thereto and is the reference signal output of oscillator 28 provided in parallel thereto. Gates 50 and 52, threshhold detectors 46 and 48 and demodulator 40 cooperate to provide the directional counting signal to counter 30, as will be decribed in greater detail hereinafter.

The indication of fuel or fluid quantity within the tank is preferably provided by the indicator system 10 of FIG. 2 in the following manner. The scaled reference signal output of converter 24 is fed via path 26 to the computing digital-to-analog converter 22 which receives its magnitude signal from the up/down counter 30 stages 32, 34, 36 in parallel as this output is provided to digital display 38. The output of converter 22 is fed through the reference probe or capacitor 14 of the tank while a signal of opposite phase, but identical frequency, is fed to the sensing probe or capacitor 12 from oscillator 28. These two signal outputs of sensing capacitor 12 and reference capacitor 14 are preferably summed at the high gain operational amplifier 16 summing junction 18. As previously mentioned, zero set converter 20 preferably feeds a zero set bias signal to the sensing loop circuit at summing junction 18. When the magnitude of the output signal of computing digital-to-analog converter 22 is equal to the magnitude of the sensing capacitor 12 output signal, the output of the operational amplifier 16 will be zero since these two signals are opposite in phase. The output of operational amplifier 16 which is the magnitude of the difference between the digital-to-analog signal to the reference probe 14 and the fixed reference signal provided from oscillator 28 to the sensing probe 12 is 90 degrees reference demodulated by demodulator 40 and fed to the voltage comparator 44 which provides an up or down direction dependent on the error signal at the output of operational amplifier 16 and appropriately gates the counting clock signal provided from oscillator 28 to the appropriate gate 50 or 52 depending on the direction determined by the comparator 44 through the up/down counter 30 and, therefrom, to the computing digital-to-analog converter 22 which will count in the appropriate direction to achieve null. When the sensing loop, which may be termed a "servo control loop" is at null, the signal feeding the computing digital-to-analog converter 22 from the up/down counter 30 is the binary coded decimal equivalent of the quantity, such as the number of pounds of fuel or fluid in the tank. This binary coded decimal signal is decoded and displayed in conventional fashion by the solid state decimal read out 38, such as one comprising light emitting diodes.

As was previously mentioned, the zero biasing signal being fed into the summing junction 18 of the error operational amplifier signal 16 sets the appropriate zero for that fuel tank configuration being utilized. Thus, the null balancing technique operates with a carrier signal provided from the oscillator 28, such as a typical carrier signal of 10 kilohertz. Since the current through the capacitor 12 is proportional to the magnitude of the capacitance, a change in capacitance will change the current flowing through the probe. This current flow is proportional to the magnitude of the capacitance times the frequency times the voltage applied to the probe. The computing digital-to-analog converter 22 nulls a change in sensing probe 12 capacitance by changing the applied voltage to that probe and balancing the current through the reference 14 and sensing probes 12. Since the current through the probes, if the probes are purely capacitance as is preferred, is 90 degrees with respect to the applied voltage, the error signal present at the output of operational amplifier 16 is demodulated with the carrier signal which is 90 degrees phase shifted from the reference signal, as previously mentioned. Any contamination present in the fuel tank in the form of water provides a resistance current path which resistance current, or real component current, is 0 degrees with respect to the reference signal. This reference signal is, accordingly, eliminated as a quadrature signal in the demodulator 40 so that the effects of the resistance leakage path in the probes 12 and 14 and interconnect wiring are minimized.

As shown and preferred in FIG. 2, the output of the summing operational amplifier 16 is also preferably fed in parallel to a conventional rectifier 54 which functions as a 0 degrees reference demodulator, whose output is preferably fed to a conventional voltage comparator or threshold detector 56 which preferably senses high residual null at the output of operational amplifier 16. Since the 90 degree component, or reactive component of the error signal is held in a null condition by the up/down counter 30, the residual null is the 0 degree component, or the real component whose magnitude is proportional to the amount of contaminant, such as water, in the tank. The real component of the currents passing through the capacitor is isolated from the reactive component in this manner and threshold detected to provide an indication of the presence of contaminants within the tank, such as water, above a predetermined allowable level. This indication may be provided by means of a calibrated display or, as shown and preferred, by means of a conventional alarm 58, such as a light emitting diode, which turns on when the leakage current exceeds this predetermined allowable value associated with a predetermined quantity of contaminant in the tank. Preferably, the fluid contaminant network 54, 56, 58 will be equally responsive to a large quantity of water uncontaminated with acidic excretion, such as resulting from bacteria present in the tank which grows on the film boundaries between water and aviation fuel, or a small quantity of water contaminated with this acidic excretion, as both provide the same conductivity and cause the same increase in value of the real component of the error signal current. If desired, this fluid contaminant network 54, 56, 58 may be omitted; however, it is most preferred in aircraft installations in which there are problems associated with bacteria which normally grows on film boundaries between water and aviation fuel as this bacteria excretes an acidic compound which has a high corrosive effect on the aluminum tank structure and can cause significant damage to the structure of the aircraft and, furthermore, a large quantity of water uncontaminated with acidic excretion or a small quantity of water contaminated with the acidic excretion are equally hazardous in the fuel tanks of an aircraft.

Figure 3:
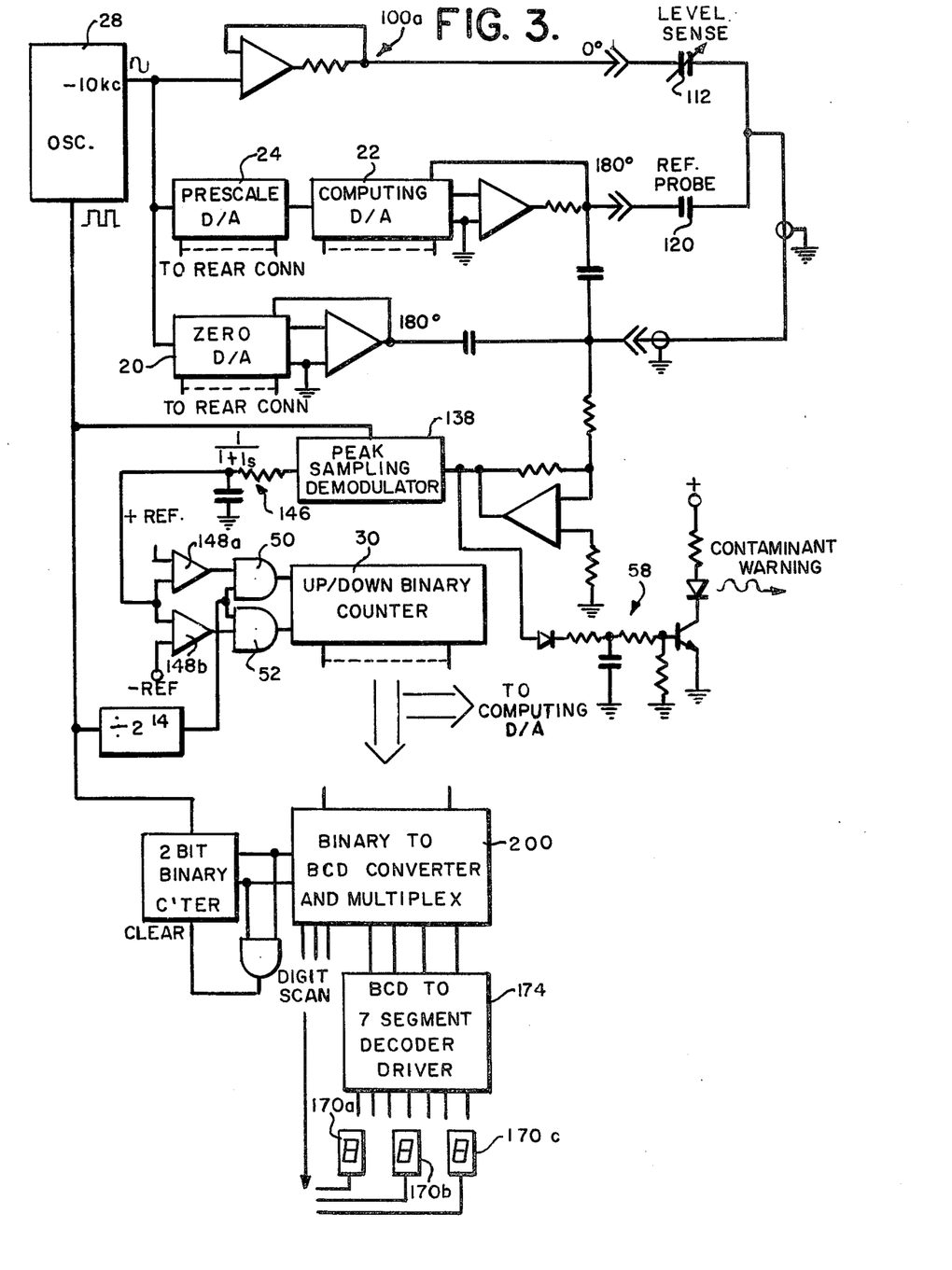
FIG. 3 is a logic block diagram, partially in schematic, of still another alternative embodiment of the fluid quantity indicator of FIG. 1.
Figure 4:
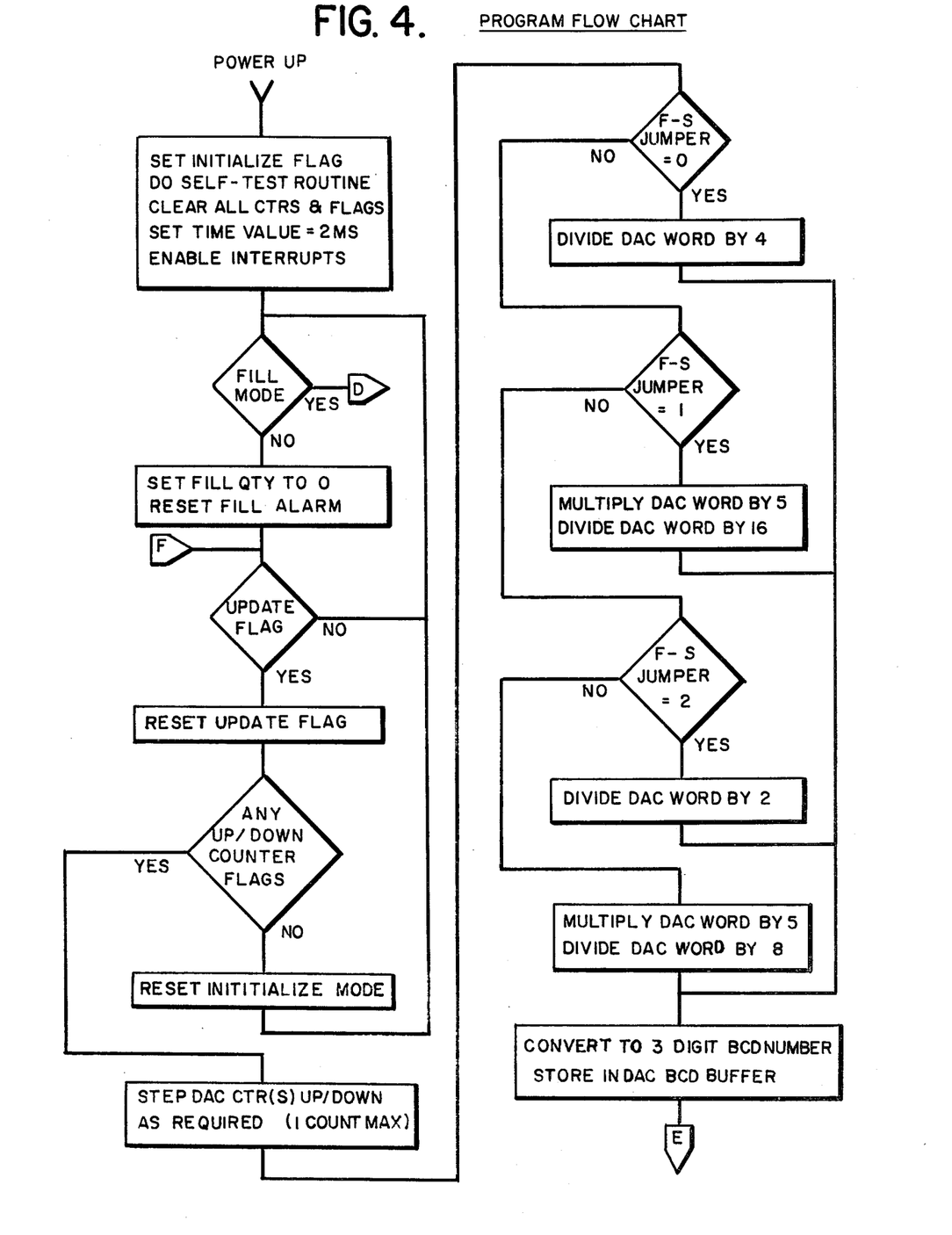
FIGS. 4-7 taken together are a typical program flow chart for a conventional control program for a typical microprocessor which may be employed in the preferred embodiment of FIG. 1.
Figure 5:
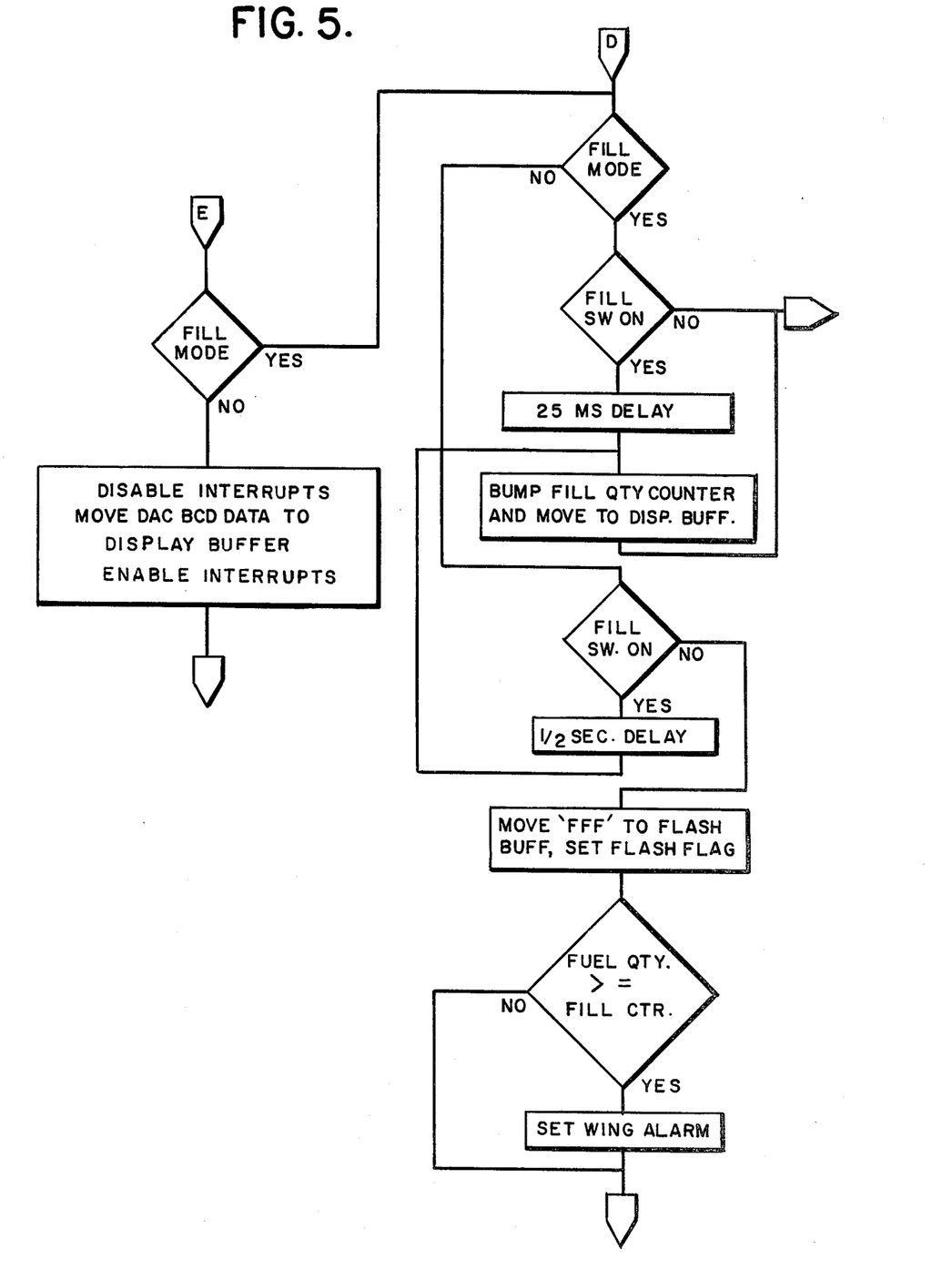
Figure 6:
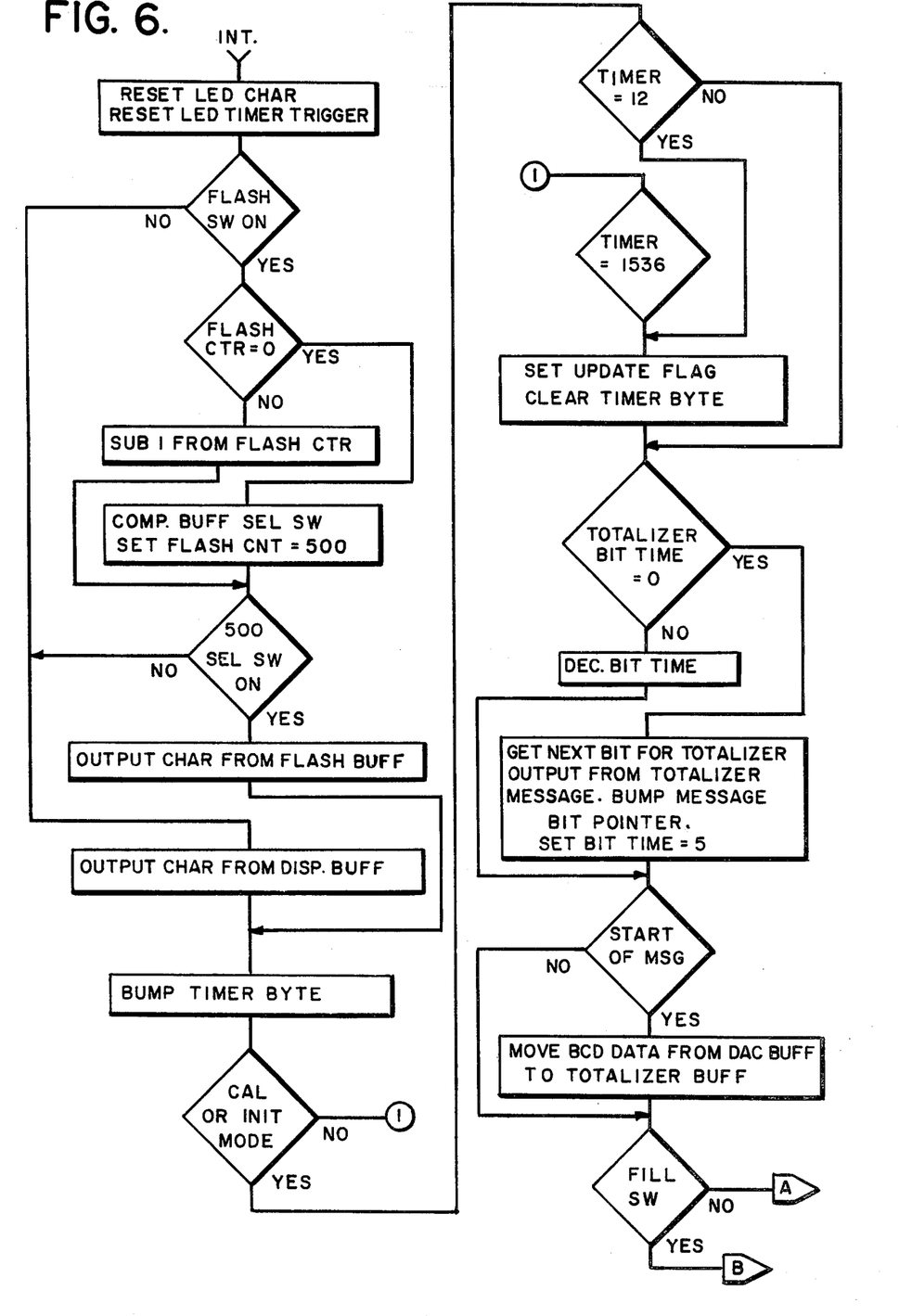
Figure 7:
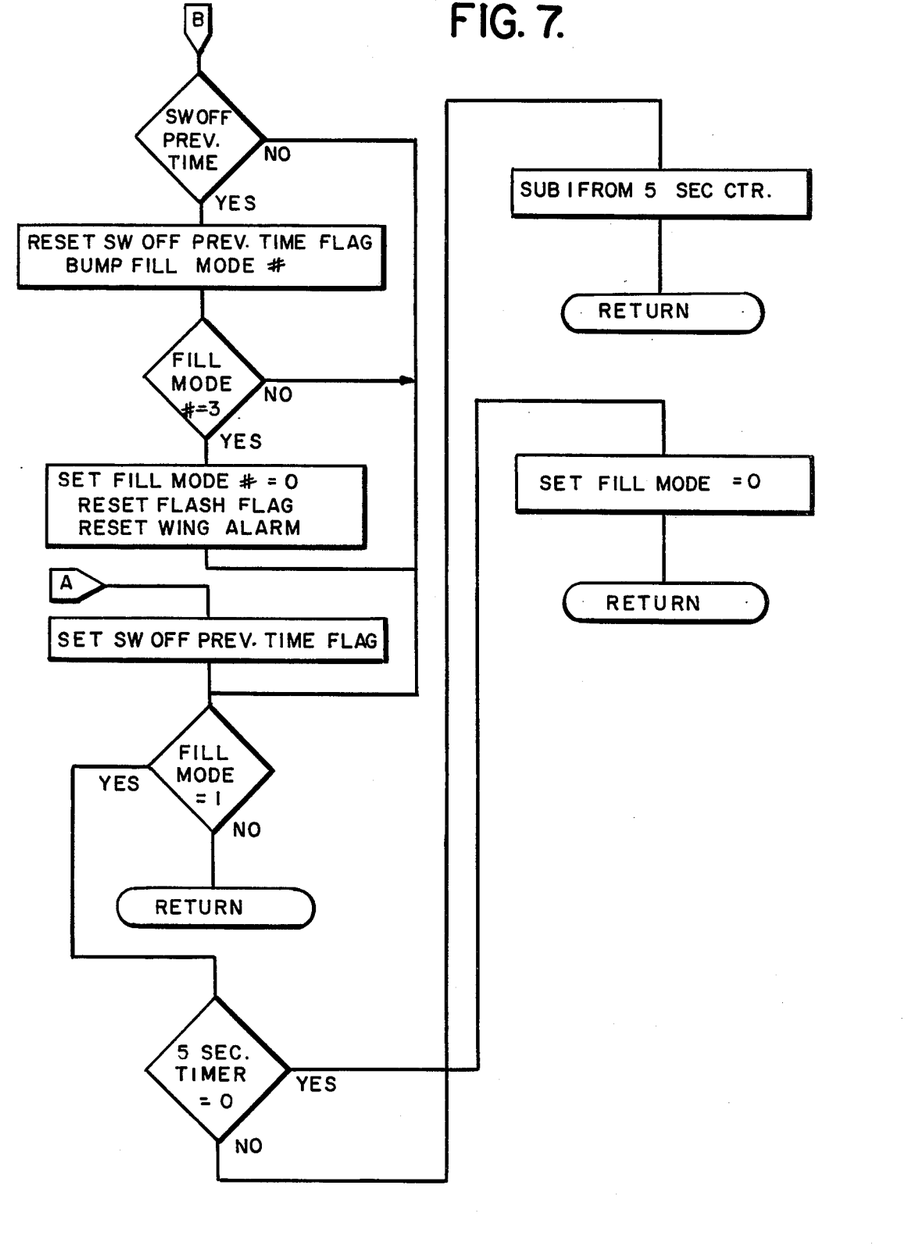

Referring now to FIG. 3, still another alternative embodiment 100a of the system 100 of the present invention is shown. The embodiment of FIG. 3 preferably corresponds to the embodiment of FIG. 1 with the exception that the microprocessor 154 is preferably replaced by its conventional hard-wired equivalent, such as previously described with reference to FIG. 2 and with the zero set potentiometer 130 and full scale set potentiometer 106 preferably being replaced by converters 20 and 24 as was described with reference to FIG. 2. The functioning of the system 100a illustrated in FIG. 3 and its operation are preferably identical to that described with reference to FIG. 1 with the exception of the microprocessor 154 and its preferred flexibility and control being replaced by the conventional hard-wired circuitry of FIG. 3 with identical reference numerals being employed in FIG. 3 for like functioning components of FIGS. 1 and 2. Accordingly, the system 100a of FIG. 3 will not be described in greater detail hereinafter except to state that functions of microprocessor 154 are replaced by the conventional up-/down binary counter 30 as well as a conventional binary-to-binary coded decimal converter and multiplexer 200.

Thus, by utilizing the fuel quantity indicator of the present invention, a real time digital display of fluid quantity within a given container which is independent of the configuration of the container or tank for the fuel may be provided and, in addition, an indication of hazardous contaminants within the fuel in the tank may also be provided.

It is to be understood that the above described embodiment of the invention is merely illustrative of the principles thereof and that numerous modifications and embodiments of the invention may be derived within the spirit and scope thereof, such as by employing the contaminant indicating network of FIG. 2 with the embodiments of FIGS. 1 and 3.

What is claimed is:

1. In an apparatus responsive to the quantity of a fluid within a container therefor of predetermined volume, said apparatus comprising a capacitive sensing means disposed within said container volume so as to be immersible within said fluid and any air within said container volume, said capacitive sensing means having an associated variable dielectric constant, said dielectric constant being proportional to the proportionate amount of fluid within said container volume, said sensing means capacitance varying in accordance with the variation in said proportionate amount of fluid; a reference capacitive means disposed within said container so as to normally be immersible within said fluid and responsive to variations in the dielectric constant of said fluid due to environmental conditions; the improvement comprising AC reference means operatively connected to said sensing means for providing a signal having a predetermined phase and frequency thereto; first microprocessor control means for providing a control signal output indicative of said fluid quantity; first digital-to-analog conversion means having a magnitude input operatively connected in parallel to said first microprocessor control means control signal output for providing an output in response to said input, said first digital-to-analog conversion means output being operatively connected to said reference capacitive means, said output comprising a signal having a predetermined phase opposite to said AC reference means signal phase and a predetermined frequency identical therewith; said first microprocessor control means being programmable to enable a universal apparatus full scale set compensation for containers for said fluid substantially independent of said container configuration for compensating for variations in full scale capacitance of a given container and to directionally count in response to directional counting command signals provided thereto; first differential amplifier summing means having an input operatively connected to said capacitive sensing means and said capacitive reference means outputs for summing the output signals provided therefrom; first means operatively connected to said first summing means output for providing a directional counting command signal in response to said first summing means output, said counting command signal being operatively connected to said first microprocessor control means input, said first microprocessor control means counting in response to said directional counting command input signal for providing a display control signal output dependent thereon, said first microprocessor control means output further being operatively connected in parallel to a digital display means for controllably providing a digital of said fluid quantity on said digital display means in response to said display control signal output; said AC reference means capacitive sensing means, capacitive reference means, first summing means, first directional counting signal providing means, first microprocessor control means and first digital-to-analog conversion means comprising a first independent digital servo control loop which is nulled when said first microprocessor control means output is equivalent to said fluid quantity, whereby a container configuration independent real time digital display of fluid quantity within a given container is provided.

2. An apparatus in accordance with claim 1 further comprising first potentiometer means operatively connected between said AC reference means and said first summing means input for gain scaling said reference signal input to said first summing means for providing zero fluid quantity adjustment thereto for said apparatus, said first microprocessor control means being programmable to provide a universal apparatus zero set compensation for containers for said fluid substantially independent of said container configuration for compensating for variations in zero fluid capacitance of a given container.

3. An apparatus in accordance with claim 2 further comprising second potentiometer means operatively connected between said AC reference means and said first summing means input for gain scaling said reference signal input to said first summing means for providing a full scale fluid quantity adjustment thereto for said apparatus.

4. An apparatus in accordance with claim 1 further comprising second digital-to-analog conversion means having a magnitude input operatively connected in parallel to said first microprocessor control means control signal output for providing an output in response to said input, said input to said second digital-to-analog conversion means being proportional to the magnitude of an in-phase leakage signal across said reference capacitive means, said second digital-to-analog conversion means output being operatively connected to said first summing means input for providing a signal in-phase with said leakage signal thereto of equivalent magnitude and opposite sense for cancelling out any real component leakage across said capacitive sensing means.

5. An apparatus in accordance with claim 4 further comprising a second differential amplifier summing means operatively connected to said AC reference means through an inverter means at a second summing junction, said second digital-to-analog conversion means output being operatively connected to said second summing junction, said first microprocessor control means enabling said second digital-to-analog conversion means to be summed with said inverted AC reference signal at half count on said second digital-to-analog conversion means for providing a zero in-phase signal output from said second summing amplifier means, said second summing amplifier output being operatively connected to said first summing means input for providing an output to said first summing means input swinging both in-phase and out-of-phase with said leakage signal for providing said real component leakage cancelling out.

6. An apparatus in accordance with claim 4 further comprising a peak sampling demodulator means operatively connected to said first summing amplifier means output for sampling said first summing amplifier means output at substantially 90 degrees with respect to said AC reference signal, second means operatively connected to said peak sampling demodulator means output for providing a second directional counting in-phase command signal to said first microprocessor control means input in response to said peak sampling demodulator means output, said first microprocessor control means providing said proportional control signal input to said second digital-to-analog conversion means in response to said in-phase command signal input, said AC reference means capacitive sensing means, capacitive reference means, first and second summing means, second directional counting signal providing means, first microprocessor control means, second digital-to-analog conversion means and peak sampling demodulator means comprising a second independent digital servo control loop only responsive to said in-phase signal and which is nulled when said first microprocessor control means proportional control signal output to said second digital-to-analog conversion means is in-phase with said leakage signal and of equivalent magnitude and opposite sense thereto.

7. An apparatus in accordance with claim 6 further comprising multiplexer means operatively connected between said first and second directional counting means outputs and said first microprocessor control means input for enabling said first microprocessor control means to controllably scan said directional command signals from said first and second independent digital servo loops and selectively provide said control signal outputs to said first and second digital-to-analog conversion means inputs in response thereto.

8. An apparatus in accordance with claim 6 wherein said fluid is aviation fuel and said container is a tank therefor.

9. An apparatus in accordance with claim 4 wherein said fluid is aviation fuel and said container is a tank therefor.

10. An apparatus in accordance with claim 1 wherein said first microprocessor control means comprises means for sequentially strobing said digital display means with said display control signal output for providing said digital display of said fluid quantity.

11. An apparatus in accordance with claim 10 wherein said digital display means comprises a plurality of separate displays combinable to provide a total display of said fluid quantity, an equal plurality of switching means operatively connected between said strobing means and an associated one of said separate displays, said first microprocessor control means strobing means sequentially enabling said switching means for sequentially scanning said total digital display of said fluid quantity.

12. An apparatus in accordance with claim 10 further comprising means operatively connected between said microprocessor control means display control signal output and each of said separate digital displays for selectively controllably blanking said separate digital displays and for controlling the intensity of said display as a direct function of the blanking interval of said separate digital displays.

13. An apparatus in accordance with claim 1 further comprising a second microprocessor control means operatively connected in parallel to said display control signal output for totalizing the fluid quantity from said given container with the fluid quantity associated with other such separate independent fluid quantity containers, whereby a total fluid quantity for a plurality of said separate fluid containers can be obtained.

14. An apparatus in accordance with claim 1 wherein said first means for providing said directional counting signal output comprises comparator means for comparing said first summing amplifier means output with a reference for determining direction for said counting signal and gating said direction determined directional counting signal to said first microprocessor control means, whereby said first microprocessor control means counts up or down dependent on said determined direction of said gated directional counting signal.

15. An apparatus in accordance with claim 1 wherein said fluid is aviation fuel and said container is a tank therefor.

* * * * *